United States Patent
Sorna et al.

(10) Patent No.: US 7,869,544 B2
(45) Date of Patent: Jan. 11, 2011

(54) SYSTEM FOR MEASURING AN EYEWIDTH OF A DATA SIGNAL IN AN ASYNCHRONOUS SYSTEM

(75) Inventors: Michael A. Sorna, Hopewell Junction, NY (US); William R. Kelly, Verbank, NY (US); Daniel W. Storaska, Walden, NY (US)

(73) Assignee: International Business Machines Corporation, Armonk, NY (US)

(*) Notice: Subject to any disclaimer, the term of this patent is extended or adjusted under 35 U.S.C. 154(b) by 561 days.

(21) Appl. No.: 11/968,872

(22) Filed: Jan. 3, 2008

(65) Prior Publication Data
US 2009/0175325 A1      Jul. 9, 2009

(51) Int. Cl.
*H04L 27/00*      (2006.01)

(52) U.S. Cl. .................. 375/326; 375/355; 375/370; 375/371

(58) Field of Classification Search .......... 375/326, 375/355, 370, 371
See application file for complete search history.

(56) References Cited

U.S. PATENT DOCUMENTS

| | | | |
|---|---|---|---|
| 7,142,623 B2 | 11/2006 | Sorna | |
| 7,184,502 B2 | 2/2007 | Engl et al. | |
| 7,206,368 B2 | 4/2007 | Engel et al. | |
| 7,225,370 B2 | 5/2007 | Chow et al. | |
| 7,315,598 B2* | 1/2008 | Lee et al. | 375/355 |
| 7,400,181 B2* | 7/2008 | Metz et al. | 327/149 |
| 7,684,531 B2* | 3/2010 | Masui et al. | 375/355 |
| 2005/0195893 A1 | 9/2005 | Brunn et al. | |
| 2007/0075759 A1 | 4/2007 | Metz et al. | |

* cited by examiner

*Primary Examiner*—Ted M Wang
(74) *Attorney, Agent, or Firm*—Ian D. MacKinnon

(57) ABSTRACT

An eyewidth of a data signal is determined by steps including: (a) recovering a phase of a clock from a data signal as a sampling clock; (b) shifting the phase of the sampling clock away from the first phase by a count multiplied by predetermined phase amount; (c) sampling the data signal with the shifted sampling clock phase to obtain sample data; d) determining whether the sample data contains error; (e) when the sample data does not contain error, recovering the phase of the clock from the data signal again for use as the first phase of the sampling clock, increasing the count value and repeating steps (b) through (e); and f) when the sample data contains error, determining the eyewidth based on the last shifted phase of the sampling clock prior to determining that the sample data contains error.

19 Claims, 4 Drawing Sheets

SYSTEM FOR MEASURING AN EYEWIDTH OF A DATA SIGNAL IN AN ASYNCHRONOUS SYSTEM

BACKGROUND OF THE INVENTION

The present invention relates to data communications and more specifically to integrated circuits which receive data signals.

High-speed serial communications systems such as High-Speed SerDes (serializer-deserializer) (HSS) cores have a need to measure and adjust for characteristics of data signals they are designed to receive. Signal characteristics such as data transmission rate, voltage levels, duty cycle and jitter can vary as presented to a receiver. The amount of jitter present in a communications link between receiver and transmitter can affect the rate at which data can be transmitted on such link. Jitter can vary from one communication link to another, depending upon the amount of noise present on the communication link, the length of a cable which spans the link and other factors which can vary between respective communication links. The eyewidth of a data signal is a measure of the jitter on a communication link. When eyewidth is narrowed by jitter, reception of the data signal becomes more prone to error. When the eyewidth is narrowed beyond a certain size, corrective action such as lowering the data transmission rate may need to be taken to avoid the error rate from becoming excessive. In view of the foregoing, there is a need for a system and method for measuring the eyewidth of a data signal.

Methods of receiving data signals can vary. In intra-system communication systems, such as the internal computer bus system described in U.S. Pat. No. 7,225,370 to Chow et al. ("Chow et al."), a clock signal is usually transmitted on a separate line from the data signal. The clock signal, being fed to both the transmitter and the receiver, maintains the operation of the transmitter and receiver in constant synchronization. Chow et al. describes a system for measuring the eyewidth of a data signal in such communication system synchronized by a separate clock line.

In contrast to the intra-system communication system described in Chow et al., in many inter-system communication systems, i.e., systems for communication between one system and another, a separate clock signal line is not available to maintain synchronization. A need exists to determine the eyewidth of a data signal in such system.

SUMMARY OF THE INVENTION

An eyewidth of a data signal can be determined by steps including: (a) recovering a phase of a clock from a data signal as a sampling clock; (b) shifting the phase of the sampling clock away from the first phase by a count multiplied by predetermined phase amount; (c) sampling the data signal with the shifted sampling clock phase to obtain sample data; d) determining whether the sample data contains error; (e) when the sample data does not contain error, recovering the phase of the clock from the data signal again for use as the first phase of the sampling clock, increasing the count value and repeating steps (b) through (e); and f) when the sample data contains error, determining the eyewidth based on the last shifted phase of the sampling clock prior to determining that the sample data contains error.

DETAILED DESCRIPTION

Figure 1:
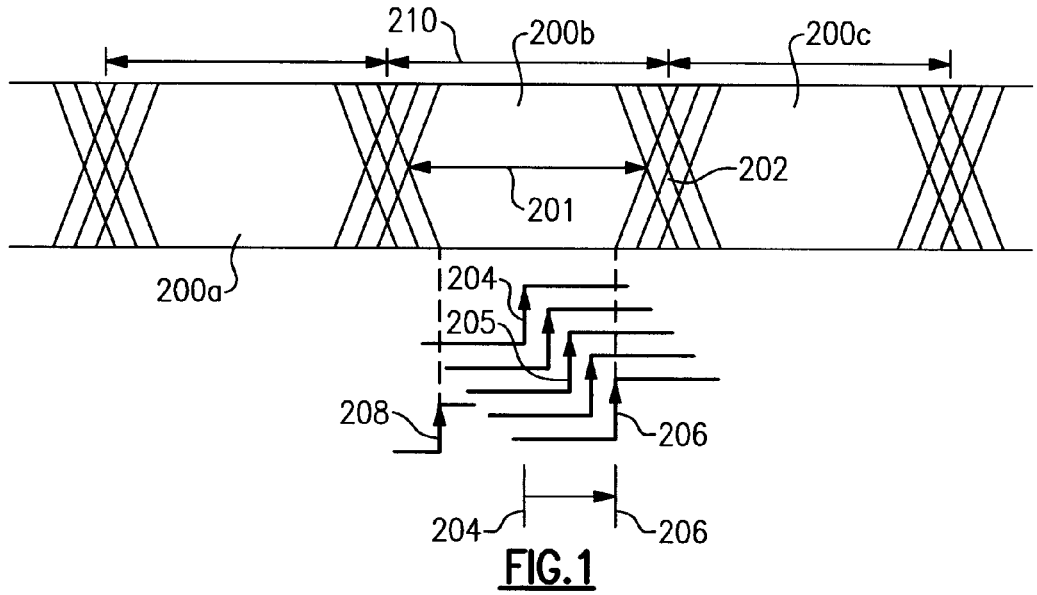
FIG. 1 is a schematic diagram illustrating a method of sampling a data signal in accordance with an embodiment of the invention.

Jitter can be defined as observable uncertainty in the timing of rising and falling edge transitions of a digital data signal. Referring to FIG. 1, a data signal is illustrated in which bits 200a, 200b, 200c are transmitted sequentially. Jitter 202 is illustrated as uncertainty in the timing of the rising and falling edge transitions of the data signal. The eyewidth 201 of a data signal is defined as the amount of time between signal transitions during which the state of a single bit of the data signal can be reliably judged.

A receiver of the data signal uses a sampling clock to sample the state of the data signal at appropriate times to determine the states of the transmitted bits. Because of jitter, the timing at which the sampling clock samples the data signal must be controlled to avoid sampling near the jitter-prone edges of the data signal.

HSS cores which are utilized for inter-system communications between an edge of one system and can be designed to receive signals which are not accompanied by clock signals carried on separate clock lines. Instead, a clock and data recovery ("CDR") circuit having a feedback control loop, e.g., a type of phase locked loop, is used to recover a clock signal from the incoming data signal at a receiver and to maintain the recovered clock signal in synchronization with the incoming data signal.

Figure 2:
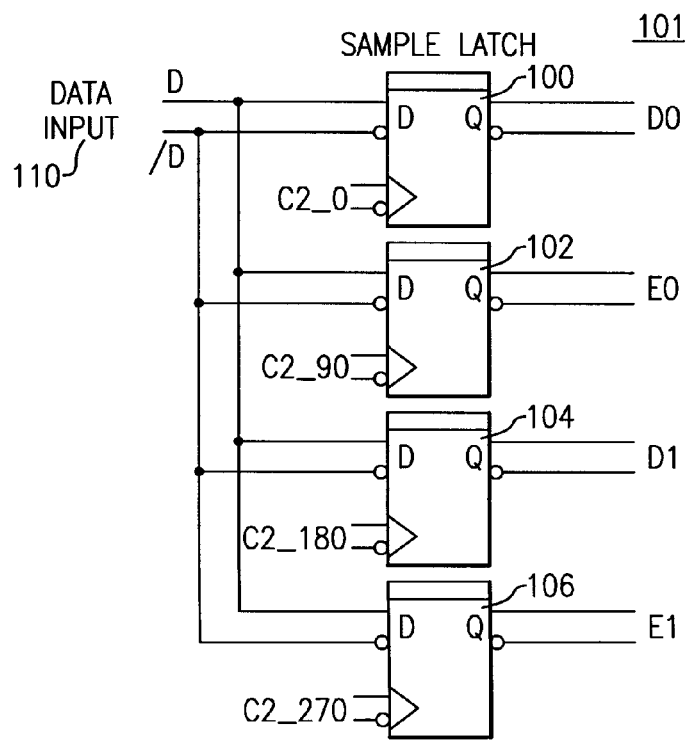
FIG. 2 is a schematic diagram illustrating a sampling circuit for obtaining sample data in accordance with an embodiment of the invention.

In an exemplary system, FIG. 2 illustrates a sample latch circuit 101 used to sample the incoming data signal to obtain sample data D0, D1 reflecting the states of bits of the data signal. The sample latch circuit 101 is also used to obtain other sample data E0, E1 containing information for use in recovering a phase of a clock signal C2_0 from the data signal in a CDR circuit to which the sample data are fed. In one embodiment, the data input signal 110 can be a rail-to-rail signal having complementary states D and /D. The data input signal 110 is fed to each of four latches 100, 102, 104 and 106 and is sampled over two bit times 210 (FIG. 1) by clock signals C2_0, C2_90, C2_180 and C2_270 respectively provided to the latches. The clock signals have four different phases: 0 degrees, 90 degrees, 180 degrees and 270 degrees. The sample data D0 and D1, which represent the states of successively transmitted bits, are obtained by sampling the data input signal 110 with the 0 degree and 180 degree phase clocks. The sample data E0 and E1 are obtained by sampling the input data signal with the 90 degree and 270 degree phase clocks.

A CDR circuit having a bang-bang phase detector (not shown) performs a logical operation, such as exclusive OR operation with respect to the samples to determine UP or DOWN feedback control inputs to the CDR circuit, in order to recover and maintain the phase of the sampling clock C2_0 in synchronization with the data signal.

As seen in FIG. 2, ideally, the rising edge of the sampling clock occurs at time 204 which falls in the middle of the eyewidth of the bit time 210. When the data signal is sampled with a sampling clock having such ideal position, the data is sampled without error. However, if the rising edge of the sampling clock is shifted to a position 206 at the edge of the data eye, the jitter in the data signal will cause the data signal to be sampled in error.

Greatly simplified, in a method of determining the eyewidth 201 of the data signal, the edge of the sampling clock can be shifted to different positions 205 which are late, i.e., at a delayed phase relative to the centered position 204. A data signal having a known sequence of data bits can then be sampled with such delayed phase sampling clock. The resulting sample data can then be compared with a locally generated replica of the known data sequence to determine whether the sample data is in error. The sampling clock can then be shifted right again to a position which is even farther from the centered position 204. The sampling clock then is used to sample the data signal again and the sample data is compared with the known data sequence for accuracy. These steps of shifting the sampling clock, sampling the data signal and comparing the sample data with the known data sequence can be repeated a plurality of times. When the position 206 is reached at which the sample data is in error, a right edge of the data eye 201 has been located. A similar process can be performed to determine the left edge 208 of the data eye by successively shifting the rising edge of the sampling clock in an early direction, i.e., towards the left edge by advancing the phase of the sampling clock, and determining whether the sample data contains error.

Figure 3:
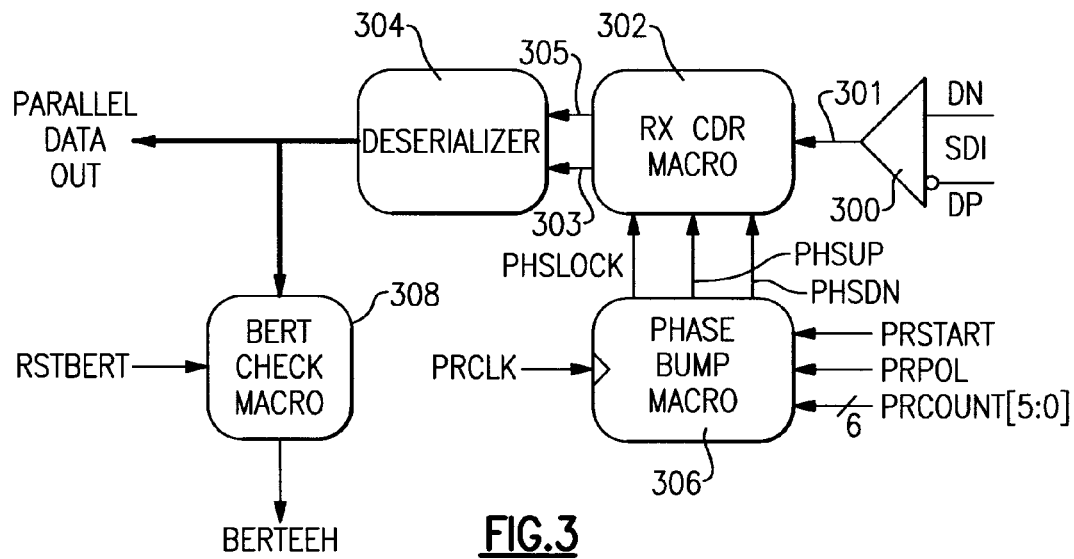
FIG. 3 is a block and schematic diagram illustrating a system for determining an eyewidth of a data signal in accordance with an embodiment of the invention.

FIG. 3 illustrates a system which can be used to determine an eyewidth of a data signal in accordance with an embodiment of the invention. As seen therein, a differential receiver 300 receives differentially transmitted serial data as a pair of differential data signals DN and DP input thereto. The output 301 of the differential data receiver is fed to a receiver clock data recovery circuit ("RX CDR Macro") or ("CDR") 302. The CDR 302 includes a feedback control loop which recovers a clock at which the data signal is transmitted and samples the data signal to produce sample data. Specifically, from sampling and processing the data signal as described above (FIGS. 1-2) the CDR generates a clock signal which tracks the frequency and phase of the clock signal originally used to transmit the data signal. The CDR also sets the rising edge of the clock signal at a centered position 204 with respect to the data eye 201 (FIG. 1) so that the data signal is sampled at an optimum timing.

As further shown in FIG. 3, sample data 303 obtained by the CDR 302 sampling the received data signal 301 are fed with a recovered clock signal 305 to a deserializer circuit 304. The deserializer circuit 304 converts the sample data to parallel data 310 for output to other circuitry. The parallel data is also provided to a BERT (bit error rate tester) Check Macro 308 which operates during a test mode. The BERT macro 308 contains circuitry which can determine whether bits are received correctly or in error. To check for a bit error rate during transmission, a known sequence of data bits can be transmitted to the differential receiver 300 from a transmitter (not shown). The known sequence of data bits can be a pseudo-random bit sequence ("PRBS") such as a Gold code or other deterministic sequence in which the state of each bit in the sequence is known based on its position in the sequence. For example a seven bit PRBS can be used as defined by the equation $1+x^6+x^7$. Such pseudo-random bit sequences are advantageous because they have no long-term direct current ("DC") component and have properties similar to the data signal usually received via the differential receiver 300. One way of generating a PRBS is to take the output of an adder connected to multiple taps of a shift register, where the output of the adder is fed back to an input of the shift register.

The BERT macro 308 determines whether the sample data received through the differential receiver 300, CDR 302 and deserializer 304 is received correctly or with one or more bit errors. The BERT macro 308 includes circuitry which generates a known sequence of data bits which exactly match the known sequence of data bits that are originally input to the transmitter (not shown) from which the data signal 301 is received. For example, the BERT macro 308 can have a pseudo-random bit sequence ("PRBS") generator which generates the same PRBS as that used in the transmitter. The BERT macro tests whether the bits of the sample data input thereto from the deserializer 304 match the PRBS locally generated by the BERT macro. So long as every successively received bit of the sample data matches the locally generated PRBS, the BERTEEH signal stays inactive, indicating that the sample data contains no error. However, once any one bit of the sample data does not match the locally generated PRBS, the BERTEEH signal becomes active. Then, even if no errors are detected subsequently in the sample data, the BERTEEH signal remains active. Upon receipt of a RSTBERT signal, the BERT macro 308 resets the BERTEEH signal to the inactive state again.

As further seen in FIG. 3, a phase bump macro circuit 306 is provided which can be used to control operation of the CDR 302 during a test mode to determine an eyewidth of the data signal. The phase bump macro 306 has an output PHSUP which directs the CDR to increase the phase of the recovered clock signal such that the rising edge of the clock occurs at a later position within the data eye. The output PHSDN of the phase bump macro directs the CDR to decrease the phase of the recovered clock signal such that the rising edge of the clock occurs at an earlier position within the data eye. The PHSLOCK output, which is active low, directs when the clock signal recovered by the CDR should remain phase-locked at the centered position 204 (FIG. 1) of the data eye. When the PHSLOCK output is inactive, that is when PHSLOCK enables non-phase locked operation, the phase bump macro 306 can raise one of the PHSUP and PHSDN outputs to increase or decrease the phase of the recovered clock from the normally centered position 204.

Several signals are used to control the operation of the phase bump macro 306. A clock input PRCLK 408 (FIG. 4) times the operation of the macro 306 and the signals PHSLOCK, PHSUP and PHSDN outputted by the macro 306. In one embodiment, the PRCLK should be slower than 1/16 the baud rate (bit transmission rate) of the data signal for best operation of the CDR and the following described method of determining the eyewidth. The PRPOL signal is a one-bit signal which controls whether the macro 306 outputs a PHSUP signal or a PHSDN signal. The PRSTART signal times that start of an operation in which the macro 306 unlocks the CDR and injects a series of PHSUP bumps 404 (FIG. 4) to increase the phase of the recovered clock signal 303. Alternatively, the macro 306 may inject a series of PHSDN bumps to decrease the phase. The PRCOUNT[5:0] is a six bit signal which indicates the number of PHSUP or PHSDN bumps to be output to the CDR for shifting the phase of the recovered clock signal away from the centered position 204.

Figure 5:
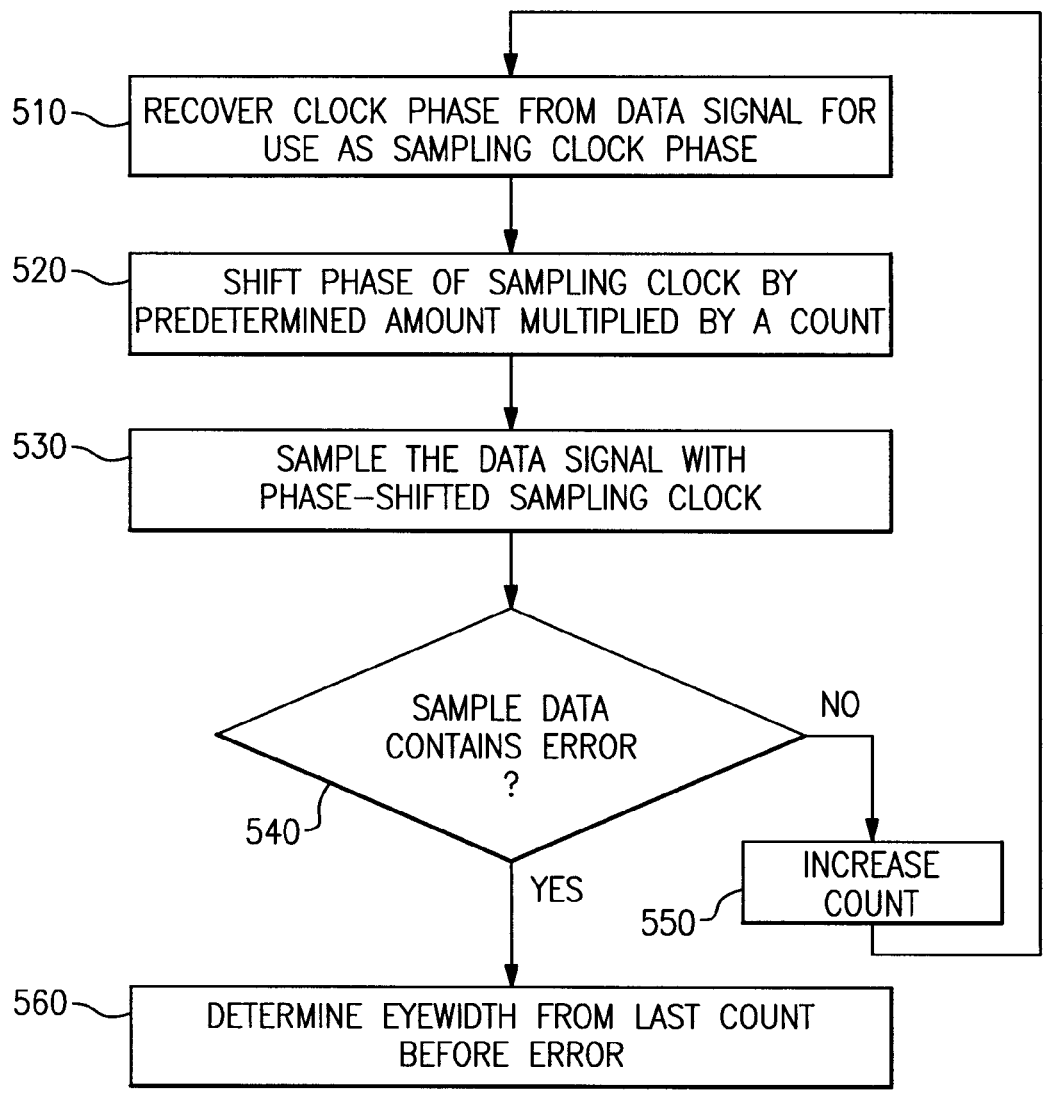
FIG. 5 is a flow diagram illustrating a method of determining an eyewidth in accordance with an embodiment of the invention.

A method of determining an eyewidth of a data signal will now be described in accordance with the flow diagram illustrated in FIG. 5. In one embodiment, a circuit such as illustrated in FIG. 3 can be used to perform the method. As illustrated in FIG. 5, in step 510 a phase of a clock is recovered from the data signal for use as a phase of a sampling clock for sampling the data signal. In one example, the method and circuitry described above with respect to FIGS. 1 through 3 can be used to recover the clock phase.

The phase of the clock then is shifted in a predetermined direction, i.e., either increased or decreased, by a predetermined amount that is multiplied by a count. For example, in a system at which data is transmitted in the data signal at a rate of 20 gigabits per second (Gbs), the bit time is 50 ps and the eyewidth is somewhat less than the bit time. In order to provide 32 steps in phase in the up direction and 32 steps in phase in the down direction, the phase can be increased or decreased in steps of 1/64 of the phase which corresponds to the original period T of the recovered clock signal, where the frequency is defined as f=1/T. In such case, the phase will be shifted, i.e., increased or decreased slightly by a step of 1/64 over the bit time 201 (FIG. 4).

Figure 4:
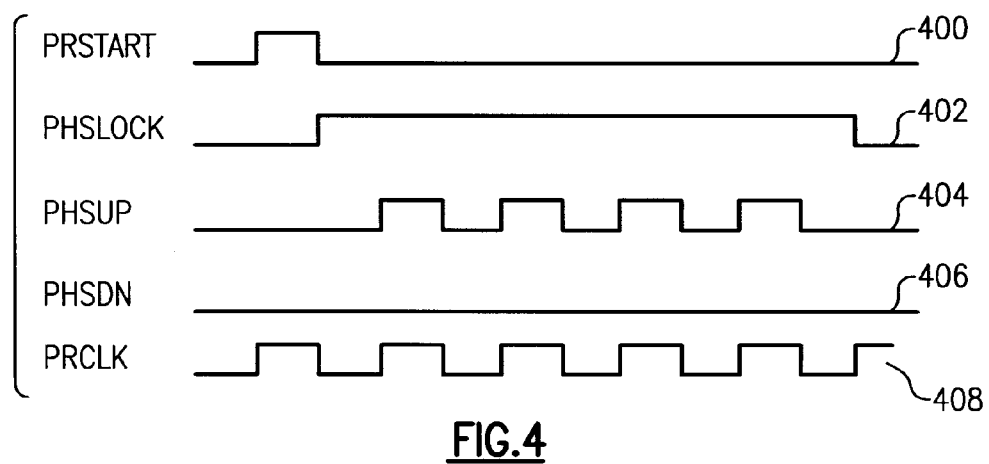
FIG. 4 is a timing diagram illustrating timing of signals in a method of determining an eyewidth of a data signal in accordance with an embodiment of the invention.

To increase the phase of the recovered clock signal, the phase bump macro 306 can operate in accordance with signals as illustrated in FIG. 4. As illustrated in FIG. 4, the PRSTART signal 400 is pulsed by the macro 306 to cause the macro to begin operating. PRPOL (FIG. 3) will be or will have already been set to UP to cause the phase to be increased. Then, PHSLOCK 402 swings high to signal that the CDR is being operated in non-phase-locked mode. A series including one or more PHSUP pulses or "bumps" 404 then is output by the macro 306 to the CDR 302. Each PHSUP bump 404 directs the CDR to increase the phase of the sampling clock by one predetermined phase amount, for example, by a phase amount of 1/64(2π/f). Thus, when the PHSUP signal contains four bumps as illustrated in FIG. 4, the phase of the sampling clock is increased by 4/64(2π/f), such that the phase of the sampling clock is increased by 1/16 of a cycle. During such operation, the PHSDN signal remains inactive, such that the phase of the sampling clock is shifted only to the right (increased) at that time rather than decreased. The PRCOUNT signal contains a count indicating how many bumps the PHSUP signal should contain. On a first pass of operation, the PRCOUNT typically is set to <000001'b>, such that the phase bump macro 306 outputs a PHSUP signal containing only one bump, the one bump directing the CDR to increase the phase of the sampling clock by just one increment.

Next, as indicated at step 530, the data signal then is sampled with the phase-shifted sampling clock. Here, the phase-shifted sampling clock, having a phase shifted away from the centered position 204 (FIG. 1) is input as the C2_0 phase clock to a sampling circuit 101 (FIG. 2). The other clock inputs to the sampling circuit are 90, 180 and 270 degrees apart in phase from the phase-shifted sampling clock. The sampling circuit 101 outputs the sample data obtained by sampling with the C2_0 sampling clock as signal D0, or as shown in FIG. 3, sample data 305 to the deserializer 304.

In step 540, it is determined whether the sample data obtained using the phase-shifted sampling clock contains an error. For this, the BERT check macro 308 tests the bits of the sample data successively against the values of a locally generated PRBS to determine if any bit of the sample data does not match the PRBS, i.e., is detected to be in error. When such bit error occurs, BERTEEH becomes active, indicating that the phase of the sampling clock has been moved to a position 206 (FIG. 1) at the edge of the eye opening 201 of the data signal. When BERTEEH indicates that no bit error has yet occurred, the edge of the eye opening has not been reached. Bit error checking continues so long as no bit is detected to be in error.

Once the PHSUP bumps 404 (FIG. 4) have been applied to the CDR and the phase of the sampling clock is increased, the PHSLOCK signal 402 reverts again to active state. When PHSLOCK is active (at the low logic level) the phase bump macro 306 directs the CDR to resume normal operation again. After many cycles of the sampling clock, the CDR eventually reaches phase-locked condition again, at which time the phase of the sampling clock recovered from the data signal is again centered at position 204 (FIG. 1) with respect to the eye of the data signal. A period of time such as 50 microseconds may be allowed to pass, such period being relatively long relative to the fundamental period (50 picoseconds) in which each bit of the data signal is transmitted. After this period time, the CDR has had sufficient time to lock the phase of the sampling clock again at the centered position 204 (FIG. 1).

Prior to testing the value of BERTEEH, the foregoing steps 510 through 530 can be repeated a number of times, e.g., 100 to 1000 times, in order to raise statistical confidence in the results. When, after repeating the foregoing steps 510 through 530, BERTEEH indicates that no error has yet been detected, a second pass is now performed for determining the position of the edge of the eye opening. To begin the second pass, PRCOUNT is increased (step 550) and the foregoing described steps 510 through 540 are again performed. However, this time the phase of the sampling clock is increased in accordance with the greater PRCOUNT value in step 520, such that the data signal is now sampled in step 530 with a sampling clock that is increased in phase by a greater amount relative to the centered position 204.

In step 540 the above-described method is used to determine whether any bit of the sample data obtained with the sampling clock having the larger increase in phase is detected to be in error. So long as BERTEEH indicates that no error is detected, in step 550 the count value is increased and steps 510 through 540 are performed again. However, when BERTEEH becomes active, this indicates that an error has been detected and that the position 206 (FIG. 1) at the right edge of the eye opening 201 has been found. In step 560 the eyewidth is now determined. The right edge of the eye opening is determined to be at the position of the edge of the phase-shifted sampling clock on the last pass prior to the error being detected.

In the embodiment illustrated in FIG. 5, the eye opening is assumed to be symmetric. Alternatively, an assumption can be implicit in the method that the right edge 206 of the eye opening 201 is no farther away from the centered position 204 than the left edge of the eye opening. In either case, in step 560 the eyewidth is determined to be twice the difference between the centered position and the last shifted position of the sampling clock before BERTEEH indicates an error.

In a variation of the above-described embodiment, the phase bump macro 306 activates the PHSDN signal instead of the PHSUP signal such that the phase of the sampling clock is now decreased by a multiple of a predetermined amount on each pass. The data signal then is sampled on each pass using a sampling clock whose rising edge is shifted left from the centered position 204. On each pass, the position of the rising edge is shifted by an increasing multiple of the predetermined amount until BERTEEH becomes active, indicating that the left edge of the eye opening has been found. Then, the eyewidth is determined to be twice the difference between the centered position and the last shifted position of the sampling clock before BERTEEH indicates an error.

Figure 6:
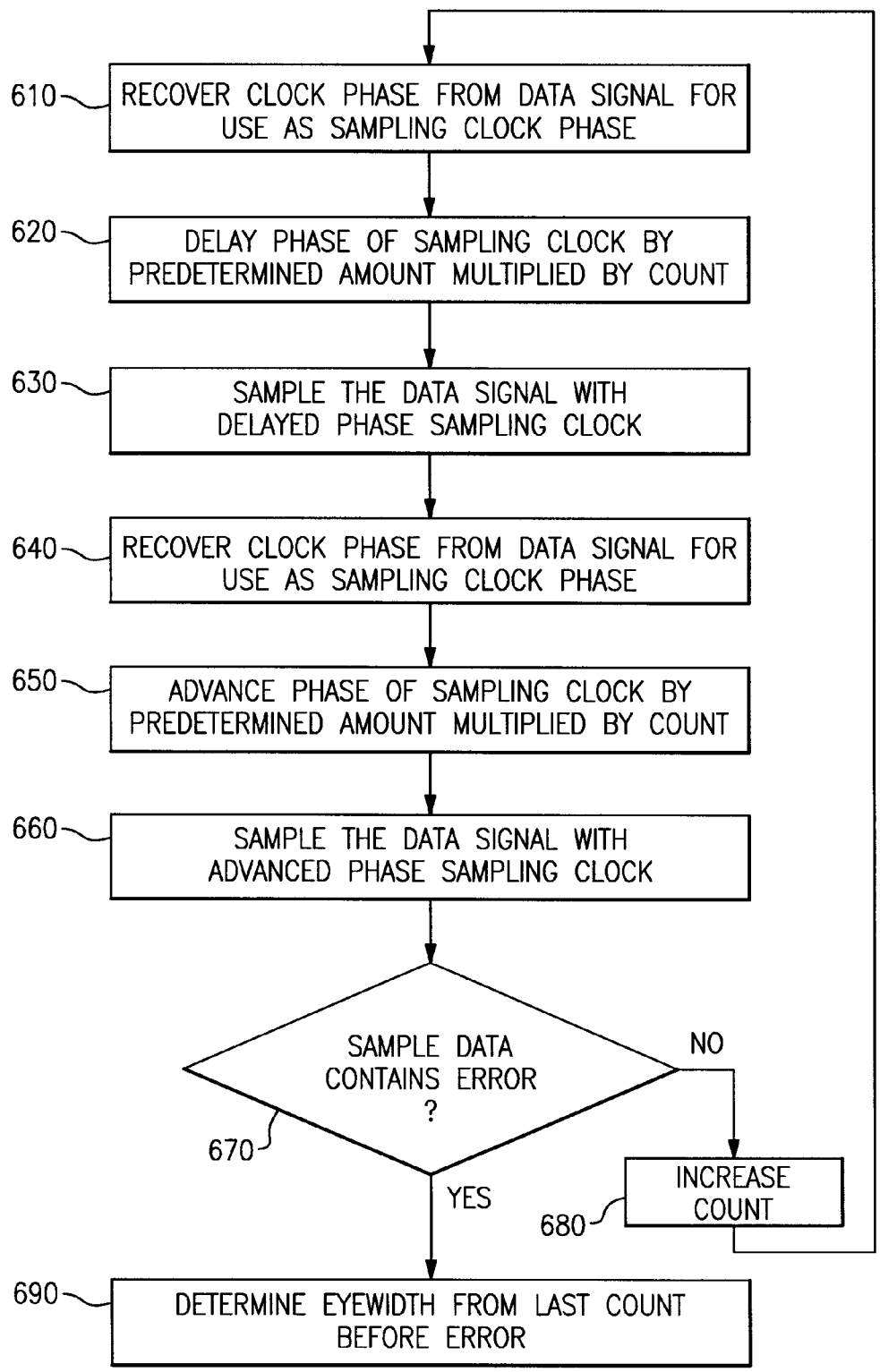
FIG. 6 is a flow diagram illustrating a method of determining an eyewidth in accordance with a variation of the embodiment of the invention illustrated in FIG. 5.

Another variation of the above-described embodiment is illustrated in FIG. 6. In this case, the data signal is sampled using a sampling clock whose phase is shifted once on each pass towards the right edge of the eye opening and once towards the left edge. The phase of a clock for sampling the data signal is recovered (step 610), such that the recovered clock phase has a centered position 204 (FIG. 1) relative to the eye opening. In step 620 the phase of the sampling clock is delayed, i.e., shifted towards the right edge of the eye opening by a value determined from a count multiplied by a predetermined phase amount. The data signal then is sampled using the sampling clock having the delayed phase (step 630). Steps 610 through 630 then can be repeated a number of times, e.g., 100 to 1000 times in order to raise statistical confidence in the result. In step 640, the CDR then is allowed to run normally and the phase of the clock at the centered position 204 is again recovered from the data signal. Then, in step 650 the phase of the sampling clock is advanced, i.e., shifted towards the left edge of the eye opening by a value determined from a count multiplied by a predetermined phase amount. The data signal then is sampled using the sampling clock having the advanced phase (step 660). Again, steps 640 through 660 then can be repeated a number of times, e.g., 100 to 1000 times in order to raise statistical confidence in the result. The sample data is tested against a locally generated PRBS for the sample data that is obtained under each of the above-discussed steps 630 and 660. In step 670, when BERTEEH does not indicate any error has occurred, the count is increased in step 680. A second pass through steps 610 through 670 then is performed with the increased count. During the second pass, the edge of the sampling clock is shifted farther towards the right edge of the eye opening during step 620 and is shifted farther towards the left edge of the eye opening during step 650.

When BERTEEH indicates that an error has occurred in step 670, the eyewidth of the data signal can now be determined. In step 690, the eyewidth can be determined as the difference between the last positions of the edges of the right-shifted sampling clock in step 620 and the left-shifted sampling clock in step 650 before BERTEEH indicated the error.

Alternatively, the eyewidth of an asymmetric eye opening can be determined more precisely as follows. When BERTEEH indicates that an error has occurred, RSTBERT can be activated to reset the value of BERTEEH to zero. Another pass can be performed through only steps 610 through 630 to determine whether the right edge of the eye opening has been found. When BERTEEH indicates an error has occurred during these steps, it is determined that the right edge of the eye opening has been found. BERTEEH then is zeroed again. However, if BERTEEH does not indicate an error when steps 610 through 630 are performed, the right edge has not yet been found. Therefore, the process will then be repeated as to only steps 610 through 630 in order to determine the position of the right edge.

After the right edge has been found, another pass can be performed through only steps 640 through 660 to determine whether the left edge of the eye opening has been found. When BERTEEH indicates an error has occurred during these steps, it is determined that the left edge of the eye opening has been found. However, if BERTEEH remains inactive on a subsequent pass through steps 640 through 660, this indicates that the left edge of the eye opening has not yet been found. Therefore, the process will then be repeated as to only steps 640 through 660 in order to determine the position of the left edge.

Whenever one of the right or left edges of the eye opening has been found, then only the ones of the above-described steps 610 through 660 which relate to the other edge of the eye opening can be performed in subsequent passes. In this way, for example, when the right edge of the eye opening is found, in subsequent passes the data signal is sampled only with the sampling clock having the phase shifted towards the left edge. Therefore, in step 690, the eyewidth can be determined as the difference between (a) the last position of the edge of the right-shifted sampling clock in step 620 before BERTEEH indicated an error on one pass and (b) the last position of the edge of the left-shifted sampling clock in 660 before BERTEEH indicated an error on a different pass.

It should be noted that the systems and methods described in the foregoing can be used which are not synchronous, i.e., in which the phase, i.e., the frequency, of a sampling clock at the receiver may vary from the phase (frequency) of the clock used to transmit the data. When there is such difference in phase, the edge position of the sampling clock at the receiver may drift in a direction away from the edge position of the data being sampled. This difference in edge position can be characterized by an offset value, usually expressed as a "ppm" (parts per million) offset.

For example, the period of the transmitter clock is $T_1=1/f_1$ and the period $T_2$ of the sampling clock at the receiver is $1/f_2$, that is, $1/(f_1*(1\pm ppm/10^6))$. $\Delta T$ is defined as $T_1-T_2$. In a case in which the baud rate is 5.0 Gbs, T then is 200 picoseconds (ps). $\Delta T$ per cycle is 0.04 ps per two unit intervals ("UI"), assuming that half rate clocking is used.

Then when PRCLK is applied to the system (FIG. 3) at a 1/16 clock rate and the count (PRCOUNT) value is 4, then the $\Delta T_{drift}$ over the number of cycles (160 unit intervals) required to shift the phase of the sampling clock can lead to fairly significant drift. Here, $\Delta T_{drift}$ is calculated to be:

$$\Delta T_{drift}=160UI/2UI*0.04\ ps=3.2\ ps.$$

The effect to the $\Delta T_{drift}$ is the CDR centered position of the eye misreads the distance to the nearest edge by that amount. When the PRCOUNT value is larger, the time drift becomes even more pronounced. In asynchronous systems such as that described herein, $\Delta T_{drift}$ is skewed in one direction. Because testing is performed to determine each of the left and right edges of the eye opening, as described above relative to FIG. 6, the width of the eye opening can be accurately determined despite that the sampling clock may be centered incorrectly relative to the transmitter clock by the extent of the time drift.

While the invention has been described in accordance with certain preferred embodiments thereof, many modifications and enhancements can be made thereto without departing from the true scope and spirit of the invention, which is limited only by the claims appended below.

What is claimed is:

1. An integrated circuit operable to determine an eyewidth of a data signal, comprising an electronic circuit operable to:
    a) recover a phase of a clock from a data signal for use as a first phase of a sampling clock;
    b) in accordance with a phase control signal having a number M of pulses, shift the phase of the sampling clock away from the first phase by a number N multiplied by a predetermined phase amount, the number N being proportional to the number M of pulses of the phase control signal;

c) sample the data signal with the shifted sampling clock phase to obtain sample data;

d) determine whether the sample data contains error;

e) when the sample data does not contain error, recover the phase of the clock from the data signal again for use as the first phase of the sampling clock, increase the number M and repeat steps (b) through (e); and f) when the sample data contains error, determine the eyewidth based on the last shifted phase of the sampling clock prior to determining that the sample data contains error.

2. The integrated circuit as claimed in claim 1, wherein the electronic circuit is operable to shift the phase in (b) by at least generating a phase up control signal having the number M of pulses for delaying the phase of the sampling clock by the number N multiplied by the predetermined phase amount and the sampling of the signal in (c) includes sampling the data signal with the delayed sampling clock phase to obtain the sample data.

3. The integrated circuit as claimed in claim 1, wherein the electronic circuit is operable to shift the phase in (b) by at least generating a phase down control signal having the number M of pulses to advance the phase of the sampling clock by the corresponding number N multiplied by the predetermined phase amount and the sampling of the signal in (c) includes sampling the data signal with the advanced sampling clock phase to obtain the sample data.

4. The integrated circuit as claimed in claim 1, wherein the electronic circuit is operable to shift the phase in (b) and to sample the data in (c) by at least generating a phase up control signal having the number M of pulses to delay the phase of the sampling clock by the corresponding number N multiplied by the predetermined phase amount and sampling the data signal with the delayed sampling clock phase to obtain the sample data, and generating a phase down control signal having the number M of pulses to advance the phase of the sampling clock by the corresponding number N multiplied by the predetermined phase amount and sampling the data signal with the advanced sampling clock phase to obtain the sample data.

5. The integrated circuit as claimed in claim 1, wherein the number N is equal to the number M.

6. The integrated circuit as claimed in claim 1, wherein the data signal includes a predetermined sequence of data values and the determination in (d) is performed by testing whether the sample data matches the predetermined sequence of data values.

7. The integrated circuit as claimed in claim 6, wherein the electronic circuit further includes a receiver of the data signal operable to perform actions (a) through (f).

8. The integrated circuit as claimed in claim 4, wherein the data signal includes a predetermined sequence of data values and action (d) is performed by determining whether the sample data obtained with the delayed sampling clock phase matches the predetermined sequence of data values and by determining whether the sample data obtained with the advanced sampling clock phase matches the predetermined sequence of data values.

9. The integrated circuit as claimed in claim 7, wherein the receiver is operable to generate the predetermined sequence of data values.

10. An integrated circuit operable to determine an eyewidth of a data signal, comprising an electronic circuit operable to:

a) recover a phase of a clock from a data signal for use as a first phase of a sampling clock and set a first number to an initial value;

b) shift the phase of the sampling clock away from the first phase by an amount defined by the first number multiplied by a predetermined phase amount;

c) sample the data signal with the shifted sampling clock phase to obtain sample data;

d) determine whether the sample data contains error;

e) when the sample data does not contain error, recover the phase of the clock from the data signal again for use as the first phase of the sampling clock, increase the first number and repeat steps (b) through (e); and f) when the sample data contains error, determine the eyewidth based on the last shifted phase of the sampling clock prior to determining that the sample data contains error.

11. A method of determining an eyewidth of a data signal, comprising:

a) recovering a phase of a clock from a data signal for use as a first phase of a sampling clock;

b) in accordance with a phase control signal having a number M of pulses, shifting the phase of the sampling clock away from the first phase by a number N multiplied by a predetermined phase amount, the number N being proportional to the number M of pulses of the phase control signal;

c) sampling the data signal with the shifted sampling clock phase to obtain sample data;

d) determining whether the sample data contains error;

e) when the sample data does not contain error, recovering the phase of the clock from the data signal again for use as the first phase of the sampling clock, increasing the number M and repeating steps (b) through (e); and f) when the sample data contains error, determining the eyewidth based on the last shifted phase of the sampling clock prior to determining that the sample data contains error.

12. The method as claimed in claim 11, wherein step (b) includes generating a phase up control signal having the number M of pulses for delaying the phase of the sampling clock by the number N multiplied by the predetermined phase amount and step (c) includes sampling the data signal with the delayed sampling clock phase to obtain the sample data.

13. The method as claimed in claim 11, wherein step (b) includes generating a phase down control signal having the number M of pulses to advance the phase of the sampling clock by the corresponding number N multiplied by the predetermined phase amount, step (c) includes sampling the data signal with the advanced sampling clock phase to obtain the sample data.

14. The method as claimed in claim 11, wherein step (b) and (c) include generating a phase up control signal having the number M of pulses to delay the phase of the sampling clock by the corresponding number N multiplied by the predetermined phase amount and sampling the data signal with the delayed sampling clock phase to obtain the sample data, and generating a phase down control signal having the number M of pulses to advance the phase of the sampling clock by the corresponding number N multiplied by the predetermined phase amount and sampling the data signal with the advanced sampling clock phase to obtain the sample data.

15. The method as claimed in claim 11, wherein the number N is equal to the number M.

16. The method as claimed in claim 11, wherein the data signal includes a predetermined sequence of data values and step (d) is performed by testing whether the sample data matches the predetermined sequence of data values.

17. The method as claimed in claim 16, further comprising generating the predetermined sequence of data values at a receiver of the data signal, wherein steps (a) through (f) are performed at the receiver.

18. The method as claimed in claim 14, wherein the data signal includes a predetermined sequence of data values and step (d) is performed by determining whether the sample data obtained with the delayed sampling clock phase matches the predetermined sequence of data values and by determining whether the sample data obtained with the advanced sampling clock phase matches the predetermined sequence of data values.

19. The method as claimed in claim 18, further comprising generating the predetermined sequence of data values at a receiver of the data signal, wherein steps (a) through (f) are performed at the receiver.

* * * * *